US006633387B1

(12) United States Patent
Okamoto et al.

(10) Patent No.: US 6,633,387 B1
(45) Date of Patent: Oct. 14, 2003

(54) METHOD AND APPARATUS FOR MEASURING OPPOSITE SURFACES

(75) Inventors: Kiyokazu Okamoto, Tsukuba (JP); Ikumatsu Fujimoto, Tsukuba (JP); Hirohisa Handa, Kawasaki (JP); Naoki Mitsutani, Tsukaba (JP)

(73) Assignee: Mitutoyo Corporation, Kawasaki (JP)

( * ) Notice: Subject to any disclaimer, the term of this patent is extended or adjusted under 35 U.S.C. 154(b) by 123 days.

(21) Appl. No.: 09/679,064

(22) Filed: Oct. 5, 2000

(30) Foreign Application Priority Data

Oct. 7, 1999 (JP) .......................... 11-286876
Oct. 15, 1999 (JP) .......................... 11-293145
Dec. 27, 1999 (JP) .......................... 11-370527

(51) Int. Cl.[7] ................................................ G01B 9/02
(52) U.S. Cl. ............................................. 356/505
(58) Field of Search .......................... 356/505, 496, 356/508, 510

(56) References Cited

U.S. PATENT DOCUMENTS 4,056,323 A 11/1977 Ludman
4,774,405 A 9/1988 Malin
5,995,226 A * 11/1999 Abe et al. .................. 356/496
6,100,977 A * 8/2000 Muller ....................... 356/496

FOREIGN PATENT DOCUMENTS

| DE | WO97/27452 | * | 7/1997 |
| EP | 0 631 107 A1 | | 12/1994 |
| WO | WO 97/33205 | | 9/1997 |

* cited by examiner

Primary Examiner—Samuel A. Turner
Assistant Examiner—Michael A. Lyons
(74) Attorney, Agent, or Firm—Oliff & Berridge, PLC

(57) ABSTRACT

An interference optical system (18) leads parallel beam to a pair of opposed test surface (M1, M2). It then leads, from the test surfaces via different optical paths (C1, C2), interference fringe images formed by radiation of the parallel beam to the test surfaces (M1, M2), respectively. The interference optical system (18) has a pair of opposite reference surfaces (S1, S2) formed thereon and defined with a highly accuracy parallelism and distance. A measurement head (27) is provided with these reference surfaces (S1, S2), which are interposed between and oppose to the test surfaces (M1, M2), respectively. Imaging devices (19a, 20a) take interference fringe images that are created through interference between a light reflected at each of the test surfaces (M1, M2) and a light reflected at the corresponding reference surface (S1, S2) opposing thereto.

15 Claims, 14 Drawing Sheets

FIG. 4
(a) 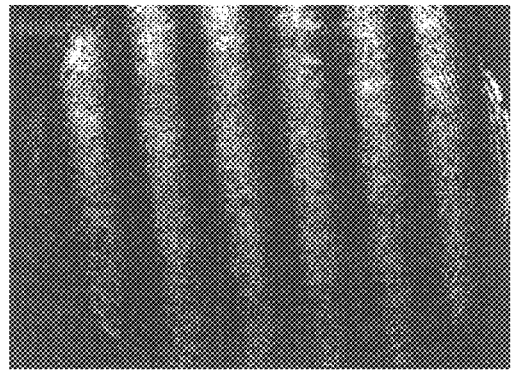
(b) 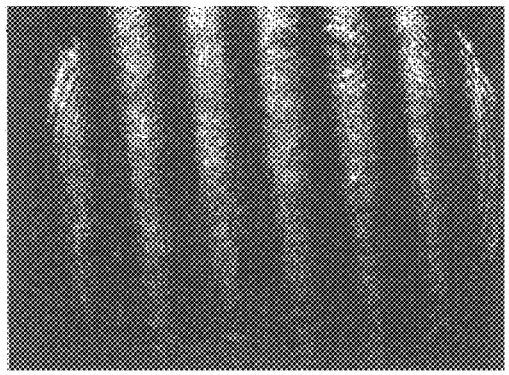
(c) 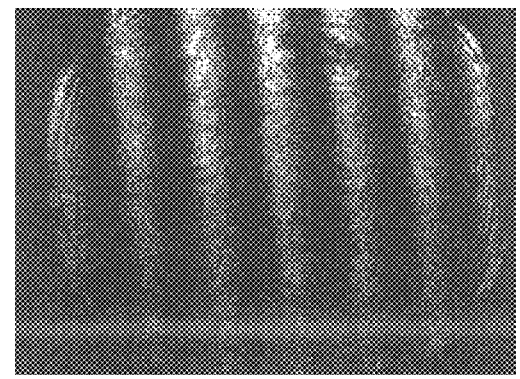

F I G. 7
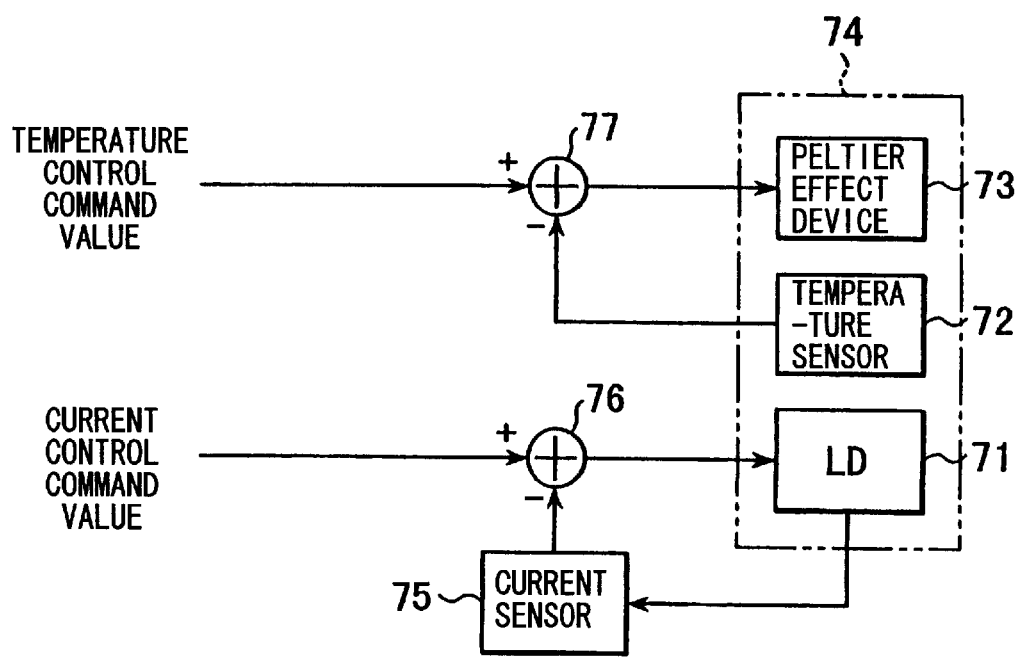

FIG. 13
(1) STATIONARY TEST SURFACE 1
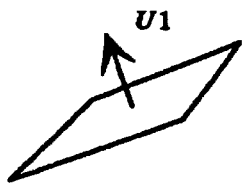
(2) STATIONARY TEST SURFACE 2
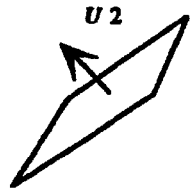
(3) ROTARY TEST SURFACE 1
(4) ROTARY TEST SURFACE 2
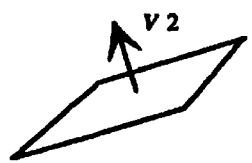

METHOD AND APPARATUS FOR MEASURING OPPOSITE SURFACES

BACKGROUND OF THE INVENTION

1. Field of the Invention

The present invention relates to a method and apparatus for measuring the parallelism of a pair of opposite surfaces of, for example, an anvil and a spindle of a micrometer, with a high accuracy.

2. Description of the Related Art

A micrometer is employed to measure a dimension of an object by interposing the object between the top surface of an anvil (a stationary surface) and the top surface of a spindle (a rotary surface) that can move linearly while rotating to measure a distance between both surfaces. It is required to measure the flatness and parallelism of such a pair of opposite surfaces with a high accuracy through, for example, a test method that has been known in the art to employ an optical parallel. A glass optical parallel used in this method has both surfaces or outwardly opposed reference surfaces that are optically lapped so as to be flat and in parallel with each other. The optical parallel is interposed between test surfaces of the micrometer to be tested or the pair of inwardly opposite surfaces to be measured, instead of the object in a usual measurement. When, interferograms (so called Newton fringes or rings) are created in contact portions between the reference surfaces of the optical parallel and the stationary and rotary test surfaces of the micrometer, they are observed visually in this method to evaluate the flatness and parallelism of the test surfaces.

This method, however, is disadvantageously difficult to execute an accurate measurement because the surface shape and parallelism is determined through the visual observation for the interferograms that appear on both surfaces of the optical parallel and therefore measures determined may reflect individual differences among operators. In addition, the conventional method requires some experience in the measurement work and thus is not always easy for anyone to perform it. This makes it difficult to reduce man-hours and costs.

The conventional method of measuring the flatness and parallelism based on Newton fringes is not applicable to the measurement through an image processing. It is also difficult to store measured data as detailed date in terms of the flatness and parallelism because a pass/fail determination is performed through the visual observation. Accordingly, the method is not possible to handle such a subject problem as an early detection of malfunctions and defects in manufacturing process and is not suitable for automating assembly and test processes.

Moreover, the test method with the conventional optical parallel, as described above, does not compute any obliquity of the rotary surface to the rotational axis (the spindle axis). Thus, it is not possible to determine the largest and smallest oblique angles between the stationary and rotary surfaces to compute the maximum and minimum of the difference between both surfaces.

From such the background, there is a requirement for a test method that is suitable for automation and capable of performing a stable measurement with a high accuracy.

SUMMARY OF THE INVENTION

In consideration of such the problems, the present invention has an object to provide an apparatus capable of measuring the parallelism of two opposite surfaces with a high accuracy without any experience and easily applicable for automation.

The present invention has another object to provide a method and apparatus, for measuring the parallelism of two opposite surfaces, capable of computing the largest and smallest oblique angles between the opposite surfaces, at least one of which can rotate.

In accordance with the present invention, an apparatus for measuring the parallelism of two opposite surfaces is provided. The apparatus comprises an interference optical system for leading parallel beam to a pair of opposed test surfaces and then leading, from the test surfaces via different optical paths, interference fringe images formed by radiation of the parallel beam to the test surfaces, respectively. It also comprises means for imaging the interference fringe images led via the different optical paths, respectively.

In the apparatus according to the present invention, leading parallel beam to a pair of opposed test surfaces and then leading interference fringe images from the test surfaces via different optical paths to means for imaging allows the interference fringe images at the test surfaces to be taken simultaneously and individually. Therefore, it is easy to obtain the flatness and parallelism of the test surfaces through the processing of results imaged from two interference fringe images.

In a preferred embodiment of the present invention, the interference optical system may include a measurement head having a pair of opposite reference surfaces formed thereon and defined with a highly accuracy parallelism and distance. The reference surfaces are interposed between the test surfaces. The reference surfaces each oppose to the respective test surfaces. The interference optical system may also include a lens system for collimating a light emitted from a light source into a parallel beam. It may further include a splitting optical system for splitting the parallel beam from the lens system into two optical paths, leading the two split parallel beam to the test surfaces via the reference surfaces and then leading said interference fringe images to the means for imaging. In this case, each of the interference fringe images is created through interference between a light reflected at each of the test surface and a light reflected at the corresponding reference surface opposing thereto.

In the interference optical system thus configured, two test surfaces and two corresponding reference surfaces create two interference fringe images, which can be imaged via two independent optical paths, respectively.

Preferably, for a highly accuracy measurement, the measurement head may be provided at the outside of at least one of the reference surfaces with a movable pressure plate for applying an appropriate measuring force onto the test surfaces.

Preferably, the apparatus of the present invention may fur comprise an arithmetic unit for computing the flatness and parallelism of the test surfaces from the interference fringe images taken by the means for imaging. The arithmetic unit may compute the flatness and parallelism of the test surfaces using at least three optical phase-shifted interference fringe images obtained from two sets of the means for imaging while altering a wavelength of the light from the light source in several stages. In this case, detailed data with respect to the test surfaces can be obtained through an arithmetic processing.

In accordance with the present invention, another apparatus for measuring the parallelism of two opposite surfaces is also provided. The apparatus comprises an interference optical system for leading parallel beam to a pair of opposed test surfaces and then leading, from the test surfaces via different optical paths, interference fringe images formed by radiation of the parallel beam to the test surfaces, respectively. In this case, at least one of the test surfaces is rotary relatively to the other about a rotational axis substantially along the opposing direction. The apparatus also comprises means for imaging the interference fringe images led via said different optical paths, respectively. The apparatus further comprises an arithmetic unit for computing the parallelism of the test surfaces from the interference fringe images taken by said means for imaging. The arithmetic unit measures an obliquity of a rotary test surface of the pair of test surfaces at a first position and at a second position rotated from the first position about the rotational axis by a predetermined angle. It then assumes from the obliquity of the rotary test surface at the first and second positions a cone or cones described by a normal vector of the rotary test surface. The arithmetic unit finally computes at least one of the largest and smallest angles between the pair of test surfaces from axes and vertical angles of the one or more cones assumed.

In one preferred embodiment of the present invention, the interference optical system includes a measurement head having a pair of opposite reference surfaces formed thereon and defined with a highly accuracy parallelism and distance. The reference surfaces are interposed between the test surfaces. The reference surfaces each oppose to the respective test surfaces. The interference optical system also includes a lens system for collimating a light emitted from a light source into a parallel beam. It further includes a splitting optical system for splitting the parallel beam from the lens system into two optical paths, leading the two split parallel beam to the test surfaces via the reference surfaces and then leading the interference fringe images to the means for imaging. In this case, each of the interference fringe images is created through interference between a light reflected at each of the test surfaces and a light reflected at the corresponding reference surface opposing thereto.

In accordance with the present invention, a method of measuring the parallelism of two opposite surfaces is further provided. The method comprises radiating parallel beam via reference surfaces to a pair of test surfaces. The test surfaces are opposed to each other. At least one of the test surfaces is rotary relatively to the other about a rotational axis substantially along the opposing direction. The method also comprises observing individually interference fringe images each obtained from interference between a light reflected at each of the test surfaces And a light reflected at the corresponding one of the reference surfaces to measure the parallelism of the test surfaces. The method further comprises the steps of: measuring an obliquity of a rotary test surface of the pair of test surfaces at a first position and at a second position rotated from the first position about the rotational axis by a predetermined angle; assuming a cone or cones described by a normal vector of the rotary test surface from the obliquity of the rotary test surface at the first and second positions; and computing at least one of the largest and smallest angles between the pair of test surfaces from axes and vertical angles of the one or more cones assumed.

In the method of present invention, an obliquity of a rotary test surface is measured at a first position and at a second position rotated from the first position by a predetermined angle. Then, a cone or cones described by a normal vector of the rotary test surface is/are assumed from the obliquity of the rotary test surface at each position. Therefore, it is possible to compute the largest and smallest angles from an angle between the axis of a normal vector of this assumed cone and a normal vector of the other test surface and a vertical angle of the cone.

The method of the present invention is applicable not only to the case where one of the pair of the test surfaces is rotary but also to the case where both of the test surfaces are rotary. If one of the pair of test surfaces is rotary and the other stationary, the method may comprise the steps of: measuring an obliquity of the other test surface and computing a normal vector of the other test surface from the obliquity measured; and computing at least one of the largest and smallest angles between the pair of test surfaces from an angle between an axis of a cone described by a normal vector of one test surface and a normal vector of the other test surface and a vertical angle of the cone.

If the pair of test surfaces are both rotary, the method may comprise the step of computing at least one of the largest and smallest angles between the pair of test surfaces from angles between axes of cones described by respective normal vectors of the test surfaces and vertical angles of the respective cones.

In a preferred embodiment of the present invention, the step of measuring an obliquity of a rotary test surface includes the steps of: obtaining a plurality of the interference fringe images with different phases through a plurality of measurements per one position and test surface; analyzing the plurality of interference fringe images to compute a height of each test surface acquired from the prey step; and computing an obliquity of a typical plane of the each test surface from the height of each test surface obtained from the preceding step.

The typical plane of the test surface may be computed using height data of each test surface through the least mean-square method. Alternatively, a plane that circumscribes the top portion or inscribes the bottom portion of the height data of each test surface may represent the typical plane. In measurement along with rotating the test surface, the apparatus of interferometer is necessary to be removed and rearranged. In this case, the standard test surface (the stationary surface) causes differences in its location to be measured. To solve this problem, the step of measuring an obliquity of a rotary test surface may comprise the steps of: obtaining a group of interference fringe images S1 of one of the pair of test surfaces at a first position and a group of interference fringe images R1 of the other at the first position; obtaining a group of interference fringe images S1' of one of the pair of test surfaces at the first position and a group of interference fringe images R2 of the other at the second position; computing an amount of compensation required for matching a typical plane M1' obtained from the group of interference fringe images S1' with a typical plane M1 obtained from the group of interference fringe images S1; and compensating a typical plane obtained from the group of interference fringe images R2 with the amount of compensation. From this alternative, even if the standard test surface (the stationary surface) causes differences in its location to be measured, the differences can be compensated.

The amount of compensation may include a rotational axial position and rotational angle for matching the normal vector of the typical plane M1' with the normal vector of the typical plane M1, which is also used as compensation data to ensure the compensation.

Other features and advantages of the invention will be apparent from the following description of the preferred embodiments thereof.

BRIEF DESCRIPTION OF THE DRAWINGS

The present invention will be more fully understood from the following detailed description with reference to the accompanying drawings in which:

FIG. 4 shows photographs exemplifying interference fringe images obtained by the same measuring apparatus;

FIG. 7 is a block diagram showing an example of an LD light source circuit;

FIGS. 12–16 illustrate the principle of measurement in the same measuring apparatus.

DETAILED DESCRIPTION OF THE PREFERRED EMBODIMENTS

Figure 1:
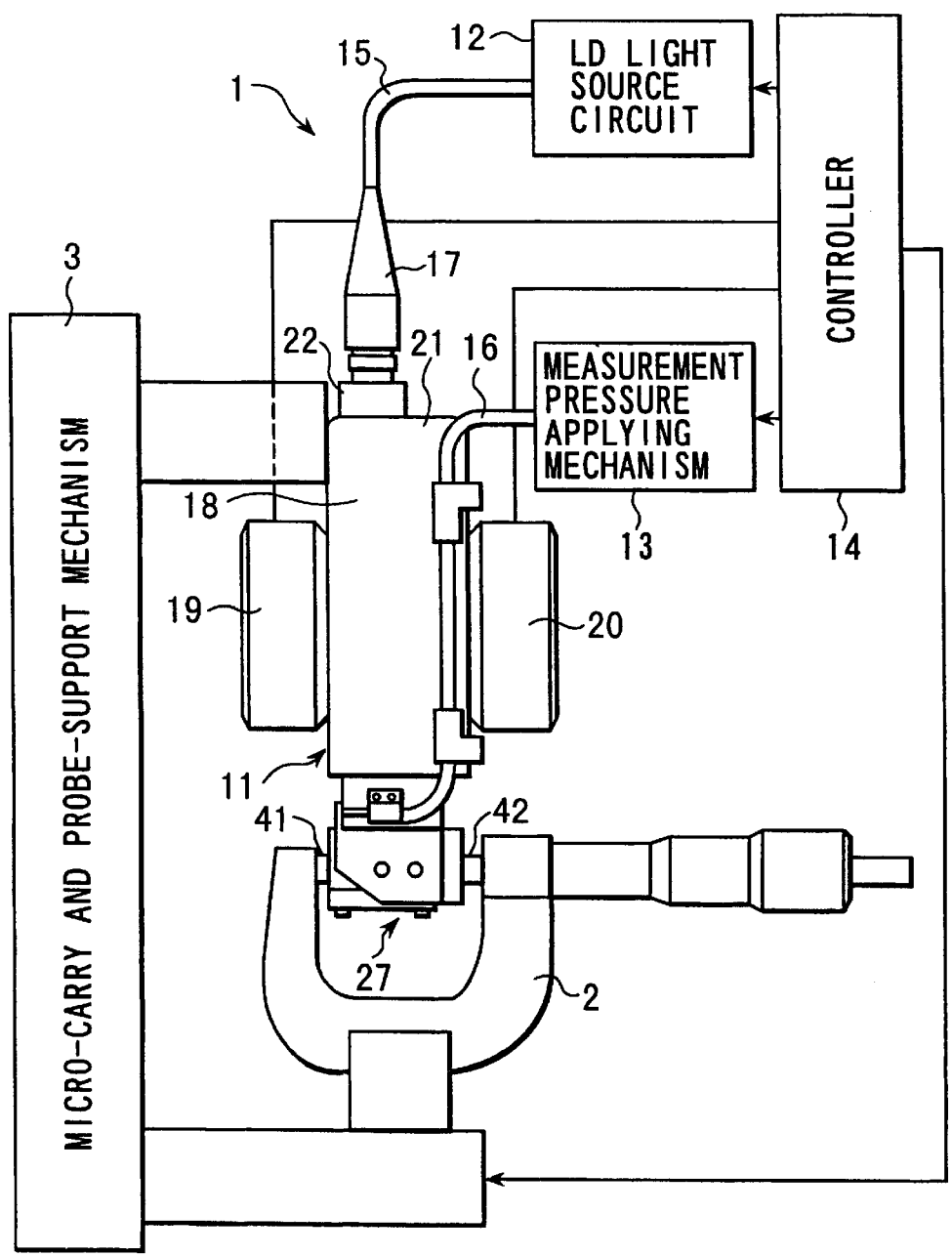
FIG. 1 shows a system for automatically measuring a micrometer with applying an apparatus for measuring the parallelism of two opposite surfaces according to an embodiment of the present invention.

Preferred embodiments of the present invention will be described below with reference to the accompanying drawings. Referring now to FIG. 1, an automatic measurement system for micrometers is shown, which employs an apparatus for measuring the parallelism of two opposite surfaces according to an embodiment of the present invention.

A micrometer 2, which is a sample to be measured, is conveyed by a micro-carry and probe-support mechanism 3 during the final stage for manufacturing or a test stage. An apparatus 1 for measuring the parallelism of two opposite surfaces according to the present invention is provided with a probe body 11, which is conveyed by the micro-carry and probe-support mechanism 3 together with the micrometer 2. An LD (laser diode) light source circuit 12 is also provided to supply a light to the probe body 11. A measuring force applying mechanism 13 is further provided to apply an appropriate measuring force onto a test surface of the micrometer 2. A controller 14 is also provided to control the above parts and the micro-carry and probe-support mechanism 3 and to execute arithmetic processes required for measurement. A polarization-maintain optical fiber 15 is employed to optically couple the LD light source circuit 12 with the probe body 11. A wire 16 is used to mechanically connect the measuring force applying mechanism 13 to the probe body 11.

The probe body 11 is connected via an optical fiber connector 17 to the polarization-maintain optical fiber 15 that extends from the LD light source circuit 12. The probe body 11 contains an interference optical system 18 formed inside to define individual optical paths each for measuring respective test surfaces and is provided with imaging means or CCD cameras 19 and 20 for to interference fringe images extracted through the interference optical system 18. A measurement head 27, described later, is formed on the lower surface of the probe body 11 as shown in the figure. Both sides of the measurement head 27 are sandwiched between the top surfaces or test surfaces of an anvil 41 and of a spindle 42 of the micrometer 2 when a measurement is perform.

Figure 2:
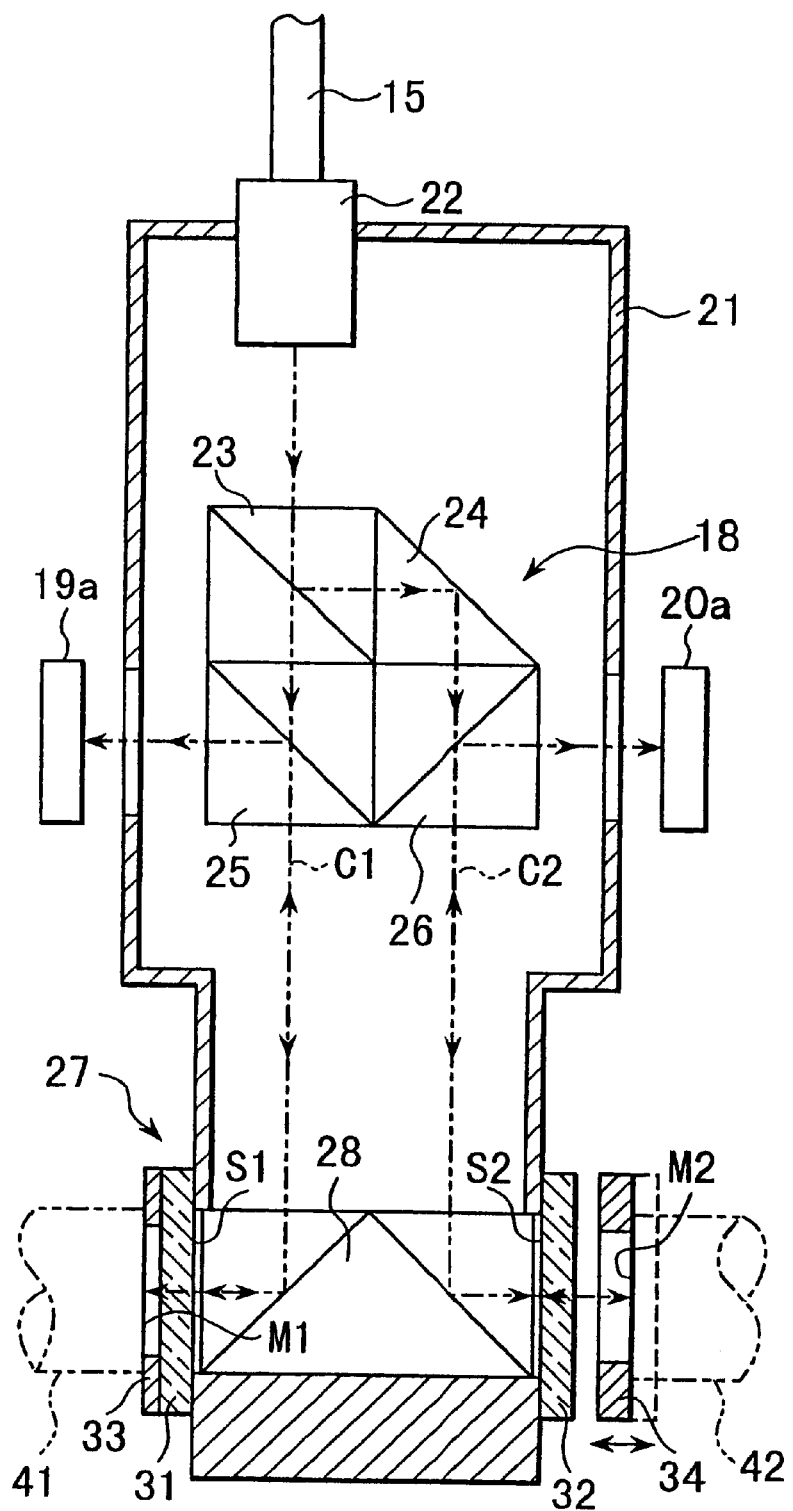
FIG. 2 illustrates a detailed arrangement of an interference optical system in the same measuring apparatus.

Referring to FIG. 2, an example of the interference optical system 18 is shown. This example employs a Fizeau interferometer as the interference optical system 18. The light emitted from the LD light source circuit 12 is led into inside an enclosure 21 via the polarization-maintain optical fiber 15. The led light is collimated at a collimator lens 22 into an about 7 mmφ beam. The parallel beam from the collimator lens 22 is introduced into a polarizing beam splitter 23, through which a part of the introduced light transmits, and from which the rest reflects and its advancing direction is bent by an angle of 90 degrees. After the advancing direction was bent by an angle of 90 degrees, the light is again bent by an angle of 90 degrees at a rectangular prism 24. As a result, the parallel beam is split into two parallel optical paths C1 and C2. The parallel beam advancing on the optical paths C1, C2 transmit through polarizing beam splitters 25, 26 and are then introduced into the measurement head 27 formed on the lower surface of the enclosure 21. A rectangular prism 28 is mounted inside the measurement head 27, at which the lights introduced into the measurement head 27 are bent each by an angle of 90 degrees in terms of their advancing directions and then travel outwardly in opposite directions from each other.

The enclosure 21 has openings in both sidewalls outside the measurement head 27 to allow lights to transmit through the openings. Transparent flat reference plates 31 and 32 are attached onto the outer surfaces of the sidewalls to close the openings. The flat reference plates 31 and 32 are composed of glass, for example, and have inner surfaces tightly contacted with the measurement head 27. The inner surfaces have reflective coatings applied thereon, in response to the reflectance of test surface M1 and M2, to be reference surfaces S1 and S2. If the sample to be measure is a pair of pinching surfaces of the anvil 41 and spindle 42 of the micrometer 2, half-mirror coatings are applied onto the reference surfaces S1 and S2. The half-mirror coatings are composed of metallic films that match with the reflectance of a carbide used to form the test surfaces M1 and M2. The Fizeau interferometer is such an interferometer that allows two lights reflected at the reference surface S1 (S2) and at the test surface M1 (M2) to interfere with each other.

In such the interferometer, a normal vector of the reference surface S1 is not always coincident with a normal vector of the reference surface S2 in general. In this apparatus, the measurement head 27 has mounting surfaces, which are well lapped to realize such parallel planes as in the grade of a gauge block, for tightly fixing two flat reference plates 31 and 32 thereon. Then, the reference surfaces of the flat reference plates 31 and 32 are fixed onto the mounting surfaces by wringing. Thus, the reference surfaces S1 and S2 can be employed as parallel reference surfaces for an extremely high accuracy interferometer. Moreover, the additional use of an appropriate calibration technology is further possible to increase the coincidence. Though measuring a obliquity of test surfaces based on each of the interference fringe images of the flat reference plates 31 and 32 and summing them, the parallelism of the test surfaces M1 and M2 can be computed.

A protective plate 33 having an opening for measurement at the center is fixedly attached by wringing on the flat reference plate 31 located at the left side of the measurement head 27. The protective plate 33 is composed of a quenched steel or carbide and lapped as high as accurate to be in parallel with the reference surface S1 of the flat reference plate 31. On the other hand, a movable pressure plate 34 having an opening for measurement at the center is provided on the flat reference plate 32 located at the right side of the measurement head 27.

Figure 3:
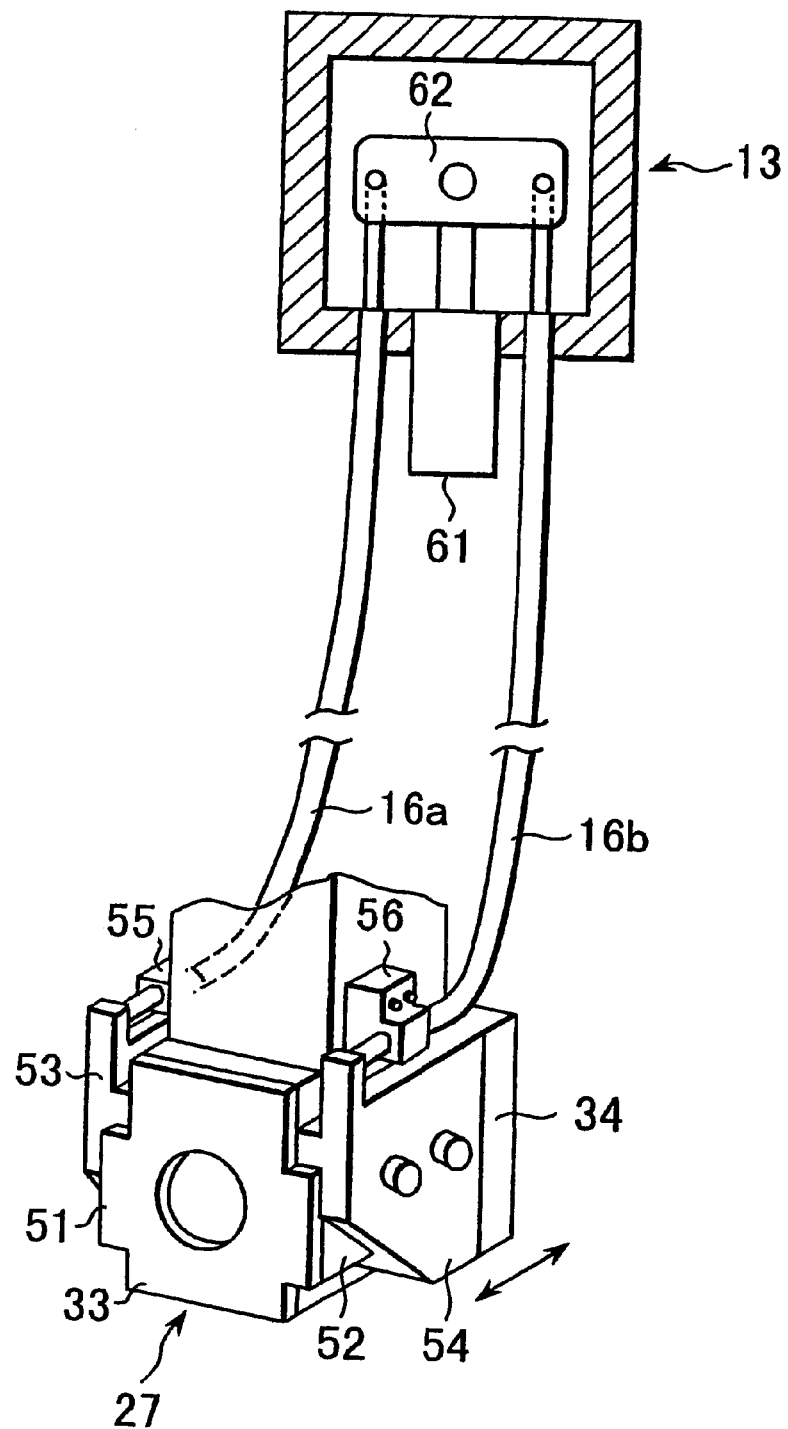
FIG. 3 is a perspective view showing a detailed arrangement of a mechanism for applying a measuring force in the same measuring apparatus.

The movable pressure plate 34 is supported by one end of sliders 53 and 54 as shown in FIG. 3, for example. The sliders are slidably mounted on linear guides 51 and 52 that are formed at front and rear sides, in the figure, of the enclosure 21 at the measurement head 27. One end of wires 16a and 16b are connected to the sliders 53 and 54 and their flexible pipes in the proximity of that end arm secured on the sliders 53 and 54 by securing members 55 and 56. The other end of the wires 16a and 16b are connected to a mechanism 13 for applying a measuring force. The pressure applying mechanism 13 transmits the reciprocal motions from the top portion of an air cylinder 61 via a link 62 to the connection ends of the wires 16a and 16b. The top portions of the air cylinder 61 and of the wires 16a, 16b are rotatably coupled to the link 62. As a result, the left and right wires 16a and 16b increase and decrease their tensions to balance them in accordance with the reciprocal motions of the air cylinder 61, which are transmitted to the sliders 53 and 54. Thus, the sliders 53 and 54 can slide equivalently at the left and right sides. This mechanism It employed to drive the movable pressure plate 34 between the test surfaces to extend the width of the measurement head 27. Thus, the fixed protective plate 33 can be made contact tightly with the stationary test surface M1. In addition, an appropriate pressure for measurement can be applied onto the test surfaces M1 and M2. The wires 16 in the dynamic tension transmission mechanism drive the movable pressure plate 34 with tensile forces to extend and thus can effect the measuring force with an adequate strength in response to objectives.

Interference fringe images are generated each from the light reflected at each of the reference surfaces S1, S2 of the flat reference plates 31, 32 and the light reflected at the corresponding one of the test surfaces M1, M2 of the anvil 41 and spindle 42. These interference fringe images first advance toward the rectangular prism 28 in opposite directions. Then, they are reflected at the rectangular prism 28, which bents their advancing directions each by an angle of 90 degrees. Further, they are reflected at the polarizing beam splitters 25, 26 and finally imaged at the imaging devices 19a, 20a in the CCD cameras 19, 20. The interference fringe images taken at the CCD cameras 19, 20 are supplied to the controller 14 for analysis.

The controller 14 controls the LD light source circuit 12 to slightly alter a wavelength of the light emitted from the LD light source circuit 12. The small variation of the optical wavelength causes an optical phase-shift to displace interferograms to be observed. A high accuracy plane shape can be obtained, using three or more phase-shifted images, through measurements with three known different wavelengths, varying the wavelength of the light. Three wavelengths are herein represented by $\lambda_k$ (k=1, 2, 3). When a distance between the test surface and the reference surface is assumed equal to h(x, y) relative to (x, y)∈S, then a phase deviation becomes $(2h*2\pi/\lambda_k=4\pi h/\lambda_k$. Therefore, a light intensity distribution in the three interferograms, $I_k(x, y)$, is represented with regard to any location (x, y)∈S by the following relation:

$$I_k(x, y) = I_B(x, y) + I_A(x, y)\cos\left(\frac{4\pi h(x, y)}{\lambda_k}\right) \quad (1)$$

where $I_B(x, y)$ denotes a bias value of the interferogram, $I_A(x, y)$ a magnitude value. The above relation then establishes:

$$C = \frac{I_1 - I_2}{I_3 - I_2} = \frac{\cos(c_1 h) - \cos(c_2 h)}{\cos(c_2 h) - \cos(c_3 h)} \quad (2)$$

$$\left(\text{where } c_k = \frac{4\pi}{\lambda_k}\right)$$

Any analytic resolution for h can not be obtained but Taylor expansion to the fourth power for h gives:

$$\cos(c_k h) \approx 1 - \frac{c_k^3}{2}h^2 + \frac{c_k^4}{24}h^4 \quad (3)$$

Substitution of this equation into the equation (2) yields the following equation for a height at any location (x, y)∈S:

$$h = \sqrt{\frac{12[(C-1)c_2^2 + c_1^2 - C^*c_3^2]}{(C-1)c_3^4 + c_1^4 - C^*c_s^4}} \quad (4)$$

For both stationary (anvil 41) and rotary (spindle 42) test surfaces, their heights at any locations have been computed through the phase shift interfering method described above. Then, an average oblique plane can be determined as follows. Representing a height of the plane with Z=f(x, y)(x, y∈S), the averaged oblique plane, defined by z=ax+by+c(x, y∈S), can be obtained through the least mean-square method:

$$\min_{a,b,c} \left\{ \sum_{k=1}^{n} [z_k - (ax_k + by_k + c)]^2 \right\} \quad (5)$$

where $z_k$ denotes a height at a location $(x_k, y_k)$ obtained through the phase shift method.

From the above equation, parameters a, b and c are computed to determine the averaged oblique plane z=ax+by+c(x, y∈S). These parameters a, b and c can be computed from the following equation:

$$\begin{pmatrix} a \\ b \\ c \end{pmatrix} = \begin{pmatrix} \sum_{k=1}^{n} x_k^2 & \sum_{k=1}^{n} x_k y_k & \sum_{k=1}^{n} x_k \\ \sum_{k=1}^{n} x_k y_k & \sum_{k=1}^{n} y_k^2 & \sum_{k=1}^{n} y_k \\ \sum_{k=1}^{n} x_k & \sum_{k=1}^{n} y_k & n \end{pmatrix}^{-1} \begin{pmatrix} \sum_{k=1}^{n} x_k x_k \\ \sum_{k=1}^{n} y_k x_k \\ \sum_{k=1}^{n} x_k \end{pmatrix} \quad (6)$$

Figure 5:
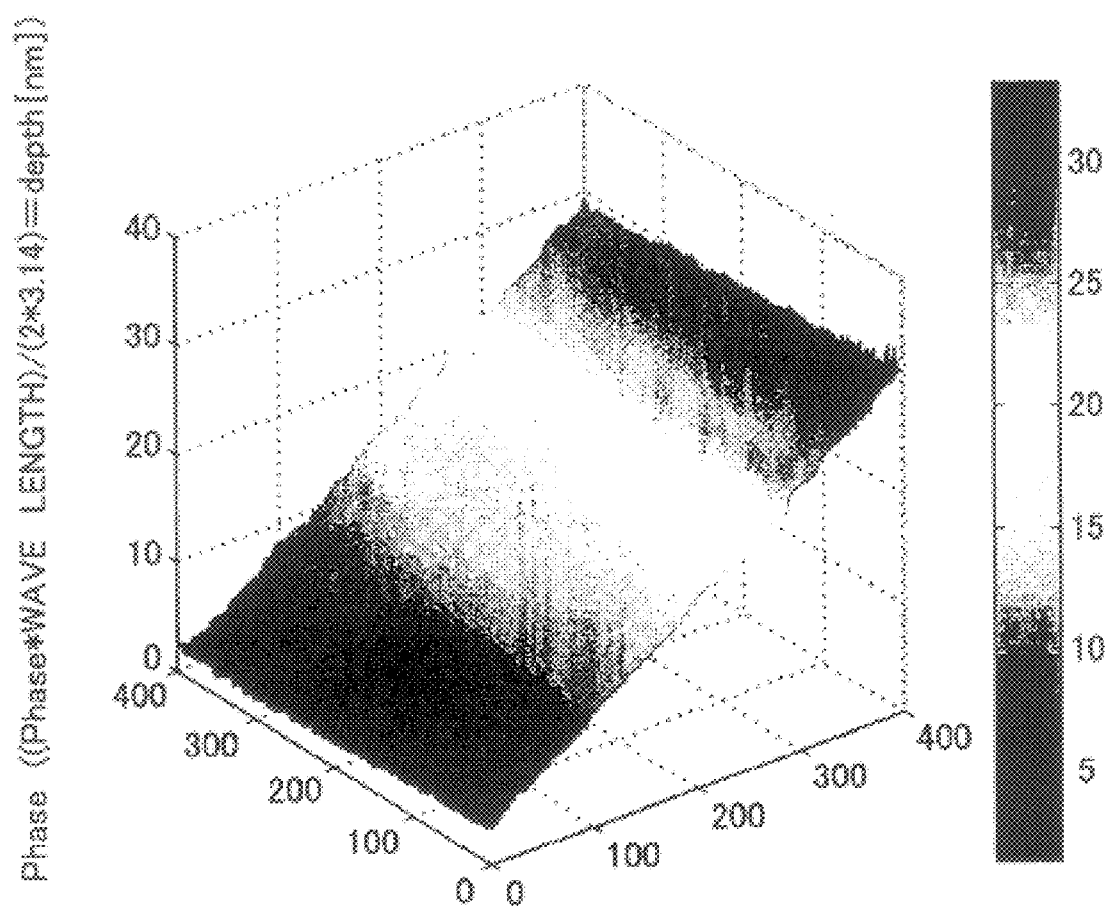
FIG. 5 shows surface shape data of a test surface obtained by the same measuring apparatus.
Figure 6:
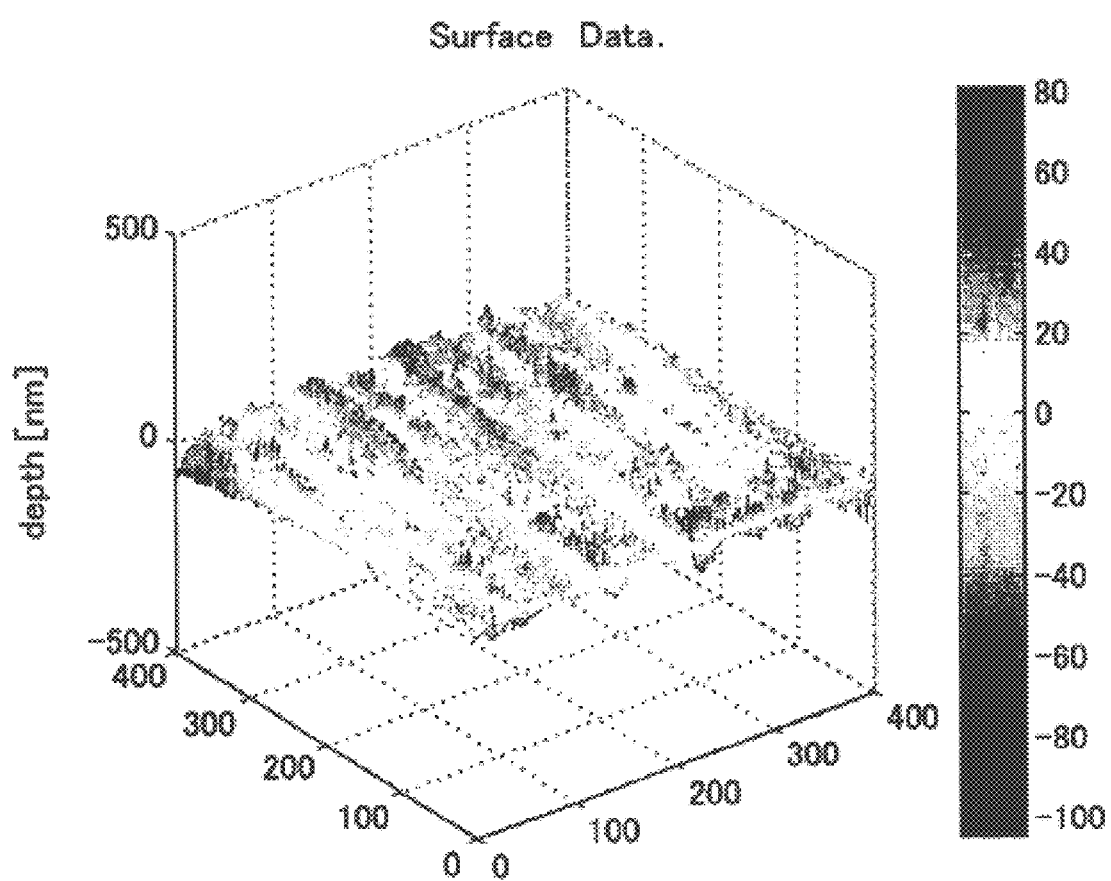
FIG. 6 shows flatness data of a test surface obtained by the same measuring apparatus.

From the approximated planes of both test surfaces thus obtained, the parallelism of both surfaces can be computed. FIGS. 4A–4C are photographs showing three interference fringe images observed with varied wavelengths. FIGS. 5 and 6 show surface shape data and flatness data obtained from a computer processing based on these interference fringe images. The surface shape data contains an amount of obliquity to the reference surfaces S1, S2 and the flatness data is obtained by decreasing the amount of obliquity from the surface shape data. Thus, the apparatus of the present invention has an advantage because a computer-aided analysis can be executed easily and a measurement can be automated.

FIG. 7 is a block diagram showing a specific example of the LD light source circuit 12, in which an LD 71, a temperature sensor 72 and a Peltier element 73 are contained in a single LD module 74. A current sensor 75 always monitors the output current from the LD 71. A subtractor 76 obtains a finite difference between the output from the current sensor 75 and a current control command value to drive the LD 71 based on the finite difference. When the current control command value is varied in order to change the drive current to the LD 71 within a range of about 10 mA, for example, an extremely small variation can be caused on optical wavelengths, resulting standard wavelengths ranging from 635 nm to 780 nm while substantially maintaining a constant light intensity. Accordingly, when the controller 14 provides the current control command values by the number of required phase-shifted images, the CCD cameras 19, 20 each time can take images of phase-shifted interferograms. Desirably, a temperature control is applied to the LD so that the wavelength of the laser light is not influenced from environmental variations. Therefore, the temperature control is performed in the following manner: the temperature sensor 72 always monitors the temperature of the LD 71; and a subtractor 77 obtains a finite difference between a temperature control command value given from the controller 14 and the output value from the temperature sensor 72 to control the Peltier element 73 based on the finite difference.

Figure 8:
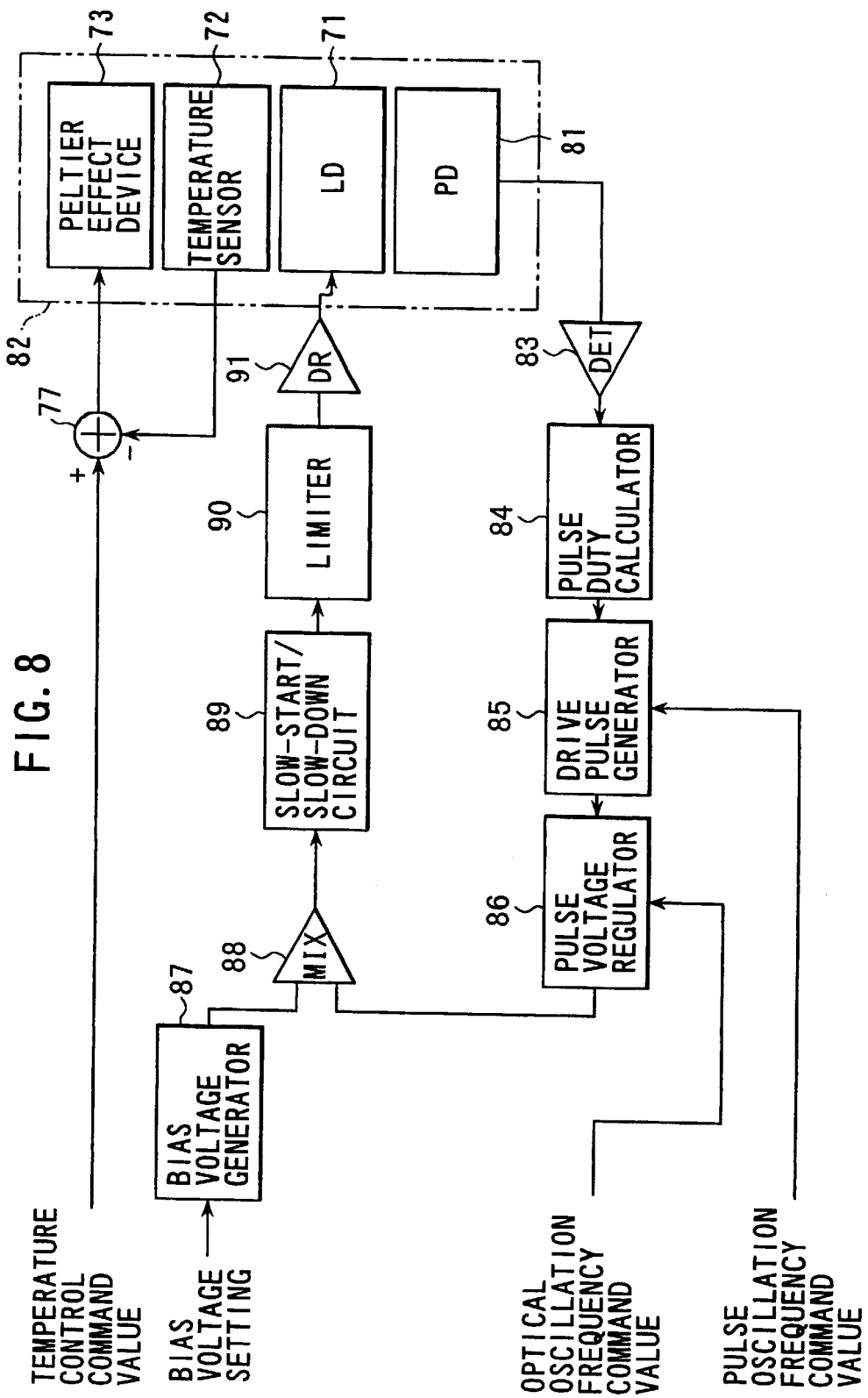
FIG. 8 is a block diagram showing another example of the LD light source circuit.
Figure 9:
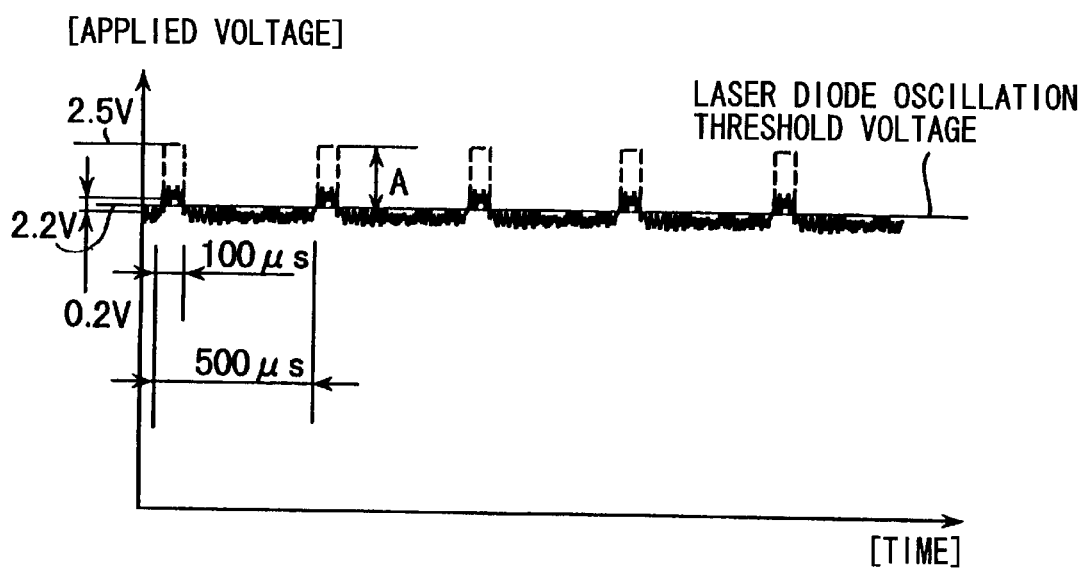
FIG. 9 shows a waveform of output pulses from the LD driver.

FIG. 8 is a block diagram showing a further example of the LD light source circuit 12. A waveform of the drive current supplied to the LD 71 in this example is designed to have such the form of pulses as shown in FIG. 9. Instead of the current control command value in the preceding example, the controller 14 provides a bias voltage setting, an optical oscillation frequency command value and a pulse oscillation frequency command value. Together with the LD 71, temperature sensor 72 and Peltier element 73, a PD (photo-detector) 81 is also contained in a single LD module 82. The PD 81 always monitors the optical output from the LD 71. The output from the PD 81 is amplified at a photo-detecting amplifier 83 and then supplied to a pulse duty calculator 84, which determines a pulse duty so as to maintain the optical output from the LD 71 unchanged. A drive pulse generator 85 generates a drive pulse on the basis of the pulse oscillation frequency command value and a pulse duty command value. A pulse voltage of the generated drive pulse is determined at a pulse voltage regulator 86 on the basis of the optical oscillation frequency (wavelength) command value. A bias voltage generator 87 generates a bias voltage based on the bias voltage setting. A mixing amplifier 88 mixes the voltage pulse from the pulse voltage regulator 86 with the bias voltage from the bias voltage generator 7, The output from the mixing amplifier 88 is supplied first to a slow-start/slow-down unit 89 that suppresses a sharp variation at the time of activation and of completion; then to a limiter 90 that limits It with a certain voltage; and finally to a driving amplifier 91 that drives the LD 71. Thus, through the control of the pulse and bias voltages of and the pulse duty of the drive pulse, an LD output with a constant light intensity and slightly shifted-wavelength can be obtained.

As described above, in the apparatus of the present invention, instead of Newton fringes generated through the use of the optical parallel, the interference fringe images created through the use of the interferometer can be employed for measurement. Thus, the measurement of the flatness and parallelism can be executed using the image processing with a high accuracy and speed.

Figure 10:
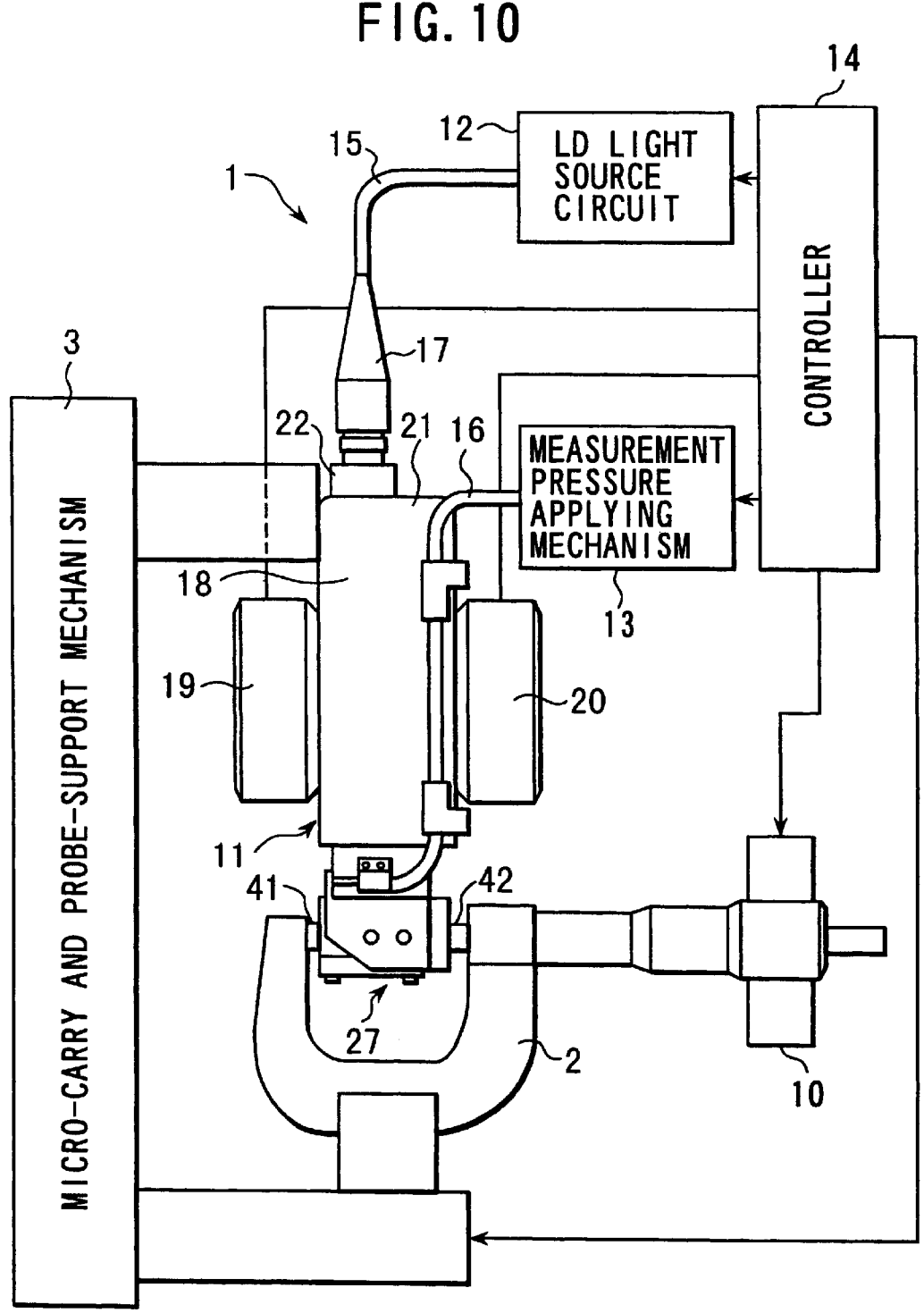
FIG. 10 shows a system for automatically measuring a micrometer with applying another apparatus for measuring the parallelism of two opposite surfaces according to the present invention.

FIG. 10 shows an arrangement of an automatic measurement system for micrometers according to another preferred embodiment of the present invention. The measurement system used in this embodiment has an almost identical configuration as that shown in FIG. 1. Accordingly, the same reference numerals are given to the parts already described and double descriptions for them are omitted.

This system includes a rotational driving mechanism 10 to rotate the spindle 42 of the micrometer 2 by an angle of 180 degrees under control of the controller 14.

On the basis of a flowchart shown in FIG. 11A, a measuring method of this embodiment will be described below:

(1) Computation of a Height at each Location on a Test Surface

A stationary test surface M1 and a rotary test surface M2 are assumed to have regions to be measured at their central portions, respectively. A phase shift method requires a measurement with three known different wavelengths. Thus, measurements are performed each three times while varying the wavelength of the LD by an extremely small amount previously known. The same measurement is repeated, through the control of the rotational driving mechanism 10, at a first position and at a second position after rotating the rotary test surface M2 by 180 degrees (S1).

Three kinds of wavelength are denoted now with $\lambda_k = \lambda - \alpha$, $\lambda$ and $\lambda + \beta$. When a distance between the test s M1, M2 and the reference surface S1, S2 is assumed z(x, y) relative to (x, y)∈S, then a phase deviation becomes $(2z*2\pi)/\lambda_k = 4\pi z/\lambda_k$.

Therefore, a light intensity distribution in the three interferograms, $I_k(x, y)$, is represented with regard to any location (x, y)∈S by the following relation:

$$I_1(x, y) = I_B(x, y) + I_A(x, y)\cos\left(\frac{4\pi z(x, y)}{\lambda} + \frac{4\pi z(x, y)}{\lambda^2}\alpha\right) \quad (7)$$

$$I_2(x, y) = I_B(x, y) + I_A(x, y)\cos\left(\frac{4\pi z(x, y)}{\lambda}\right)$$

$$I_3(x, y) = I_B(x, y) + I_A(x, y)\cos\left(\frac{4\pi z(x, y)}{\lambda} - \frac{4\pi z(x, y)}{\lambda^3}\beta\right)$$

where $I_k(x, y)$ denotes a measured value of a light intensity distribution; $I_B(x, y)$ a bias value of an interferogram; and $I_A(x, y)$ an amplitude value. From the above relation, the equation (7) is represented, under given definitions of (8), by the following equation (9):

$$\theta = \frac{4\pi z(x, y)}{\lambda} \quad (8)$$

$$\alpha' = \frac{4\pi z(x, y)}{\lambda^2}\alpha$$

$$\beta' = \frac{4\pi z(x, y)}{\lambda^3}\beta$$

$$\begin{pmatrix} I_B \\ I_A \cos\theta \\ I_A \sin\theta \end{pmatrix} = \begin{pmatrix} 1 & \cos\alpha' & -\sin\alpha' \\ 1 & 1 & 0 \\ 1 & \cos\beta' & \sin\beta' \end{pmatrix}^{-1} \begin{pmatrix} I_1 \\ I_2 \\ I_3 \end{pmatrix} \quad (9)$$

where the height information $z(x, y) = z_0(x, y)$ in $\alpha'$ and $\beta'$ is assumed to give an averaged one.

A resolution of the equation (10) gives a height $z_1(x, y) = \theta\lambda/4\pi$.

$$\theta = \tan^{-1}\left(\frac{I_1(1-\cos\beta') + I_2(\cos\beta' - \cos\alpha') +}{I_3(-1+\cos\alpha')}\right) \quad (10)$$

When $z_0(x, y)$ is given as an initial height information, if a difference $z_1(x, y)-z_0(x, y)$ is present within a given allowance, this height information $z_1(x, y)$ is adopted for the height. Otherwise, the height will be similarly obtained using the obtained $z(x, y)=z_1(x, y)$ as the initial height information (S2).

(2) Computation of an Approximated Plane having an Average Obliquity

Typical planes of the stationary M1 and rotary M2 test surfaces can be determined in the following manner since their heights at any locations have been obtained through the phase shift interference method as described above.

Representing a height of the plant by $Z=f(x, y)(x, y\in S)$, a typical plane, defined by $z=ax+by+c(x, y\in S)$, is determined as an averaged oblique plane computed through the least mean-square method (S3):

$$\min_{a,b,c}\left\{\sum_{k=1}^{n}[z_k - (ax_k + by_k + c)]^2\right\} \quad (11)$$

where $z_k$ denotes a height at a location $(x_k, y_k)$ obtained through the phase shift method.

From the above equation, parameters a, b and c are computed to determine the averaged oblique plane $z=ax+by+c(x, y\in S)$. These parameters a, b and c can be computed from the following equation:

$$\begin{pmatrix} a \\ b \\ c \end{pmatrix} = \begin{pmatrix} \sum_{k=1}^{n}x_k^2 & \sum_{k=1}^{n}x_k y_k & \sum_{k=1}^{n}x_k \\ \sum_{k=1}^{n}x_k y_k & \sum_{k=1}^{n}y_k^2 & \sum_{k=1}^{n}y_k \\ \sum_{k=1}^{n}x_k & \sum_{k=1}^{n}y_k & n \end{pmatrix}^{-1} \begin{pmatrix} \sum_{k=1}^{n}x_k z_k \\ \sum_{k=1}^{n}y_k z_k \\ \sum_{k=1}^{n}x_k \end{pmatrix} \quad (12)$$

Instead of selecting the averaged oblique plant computed through the lows mean-square method for the typical plane $z=ax+by+c(x, y\in S)$ as described above, a circumscribed plane that contacts at least three points with the top portion of the typical plane or an inscribed plane that contacts at least three points with the bottom portion of the typical plane may be selected. This case has an advantage because the computation can be processed easily.

(3) Computation of a Normal Vector U of the Stationary Test Surface M1 and Normal Vectors V1, V2 of the Rotary Test Surface M2 at Two Locations The average oblique plane of the stationary test surface M1 has been obtained through the method of (2). Accordingly, the normal vector U is represented by:

$$U = \frac{1}{\sqrt{a^2 + b^2 + 1}}(-a, -b, 1) \quad (13)$$

In this case, the normal vector U is normalized to have a length of 1 (S4).

The normal vectors V1, V2 of the rotary test surface M2 at two locations with a 180-degree difference from each other can be obtained similarly (S4). An orientation and obliquity of the plane can be defined from these normal vectors.

Figure 12:
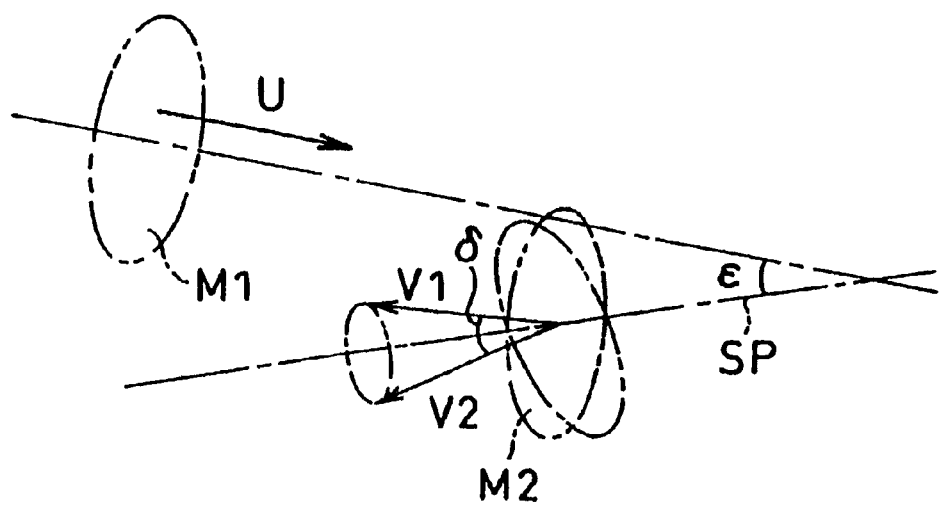

As shown in FIG. 12, the normal vector U of the stationary test surface M1 has a certain angle of ε to the spindle axis SP. The normal vector V of the rotary test surface M2 rotates to describe a conical surface. The rotation of the rotary test surface M2 has such an axis that can not deflect. Thus, the cone described by the normal vector has a circular cross-section. If the rotary test surface M2 is perpendicular to the rotation axis, the vertical angle δ of the conical surface, of course, becomes zero.

Figure 14:
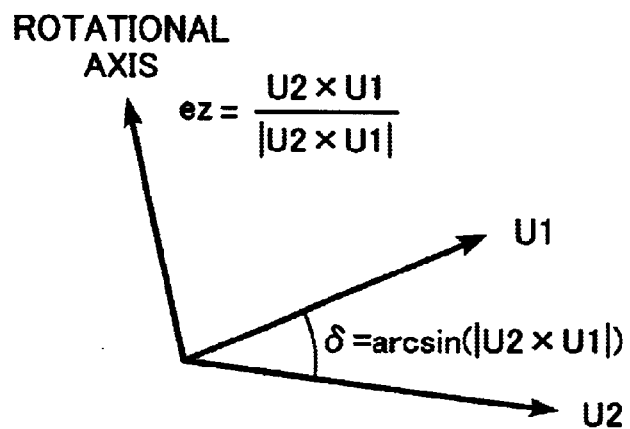

If both normal vectors of the stationary test surface 1 and to the stationary test surface 2 arm not coincident with each other as shown in FIG. 13, the normal vector U2 of the stationary test surface 2 can be rotated to meet with the normal vector U1 of the stationary test surface 1 as shown in FIG. 14. The gist of compensation lies in a rotation of V2 by an angle between U1 and U2, δ=arcsin(|U2×U1|), about a rotation axis ez=(U2×U1)/|U2×U1| (X denotes an outer product operator) and V2 once rotated becomes a compensated normal vector of the rotary test surface 2.

Figure 15:
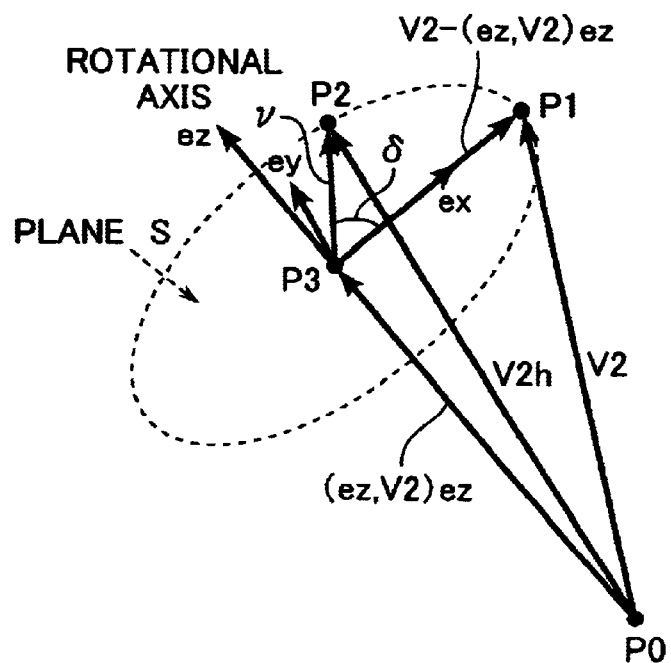

A method for compensation will be described below;

(a) As shown in FIG. 15, computing a component vector of the normal vector V2 of the rotary test surface 2, in a plane S orthogonal to the rotation axis ez, from V2−(V2, ez)ez.

(b) A unit vector ex of the above component vector is represented by:

$$ex = \frac{V2 - (V2, ez)ez}{|V2 - (V2, ez)ez|} \quad (14)$$

A vector orthogonal both to the unit vector ex and the rotation axis ez is obtained through the application of an outer product operator between ex and ez:

$$ey = \frac{ez \times ex}{|ez \times ex|} \quad (15)$$

It configures a new coordinate system (ex, ey, ez).

(c) The compensated vector V2h from the normal vector V2 of the rotary test surface 2 is obtained as follows:

A vector v resulted from a rotation of ex by an angle δ between U1 and U2 on the plane S defined by ez and ey is represented by:

$$v=(\cos(\delta)*ex+\sin(\delta)*ey)*|V2-(V2,ez)ez| \quad (16)$$

Thus, the compensated normal vector V2h of the rotary test surface 2 is determined, through synthesis of the vector v with a component vector (V2, ez)ez in the direction of the rotation axis ez of the normal vector V2 of the rotary test surface 2, and through normalization of the synthesized vector, as follows:

$$V2h = \frac{v + (ez, V2)ez}{|v + (ez, V2)ez|} \quad (17)$$

Figure 11:
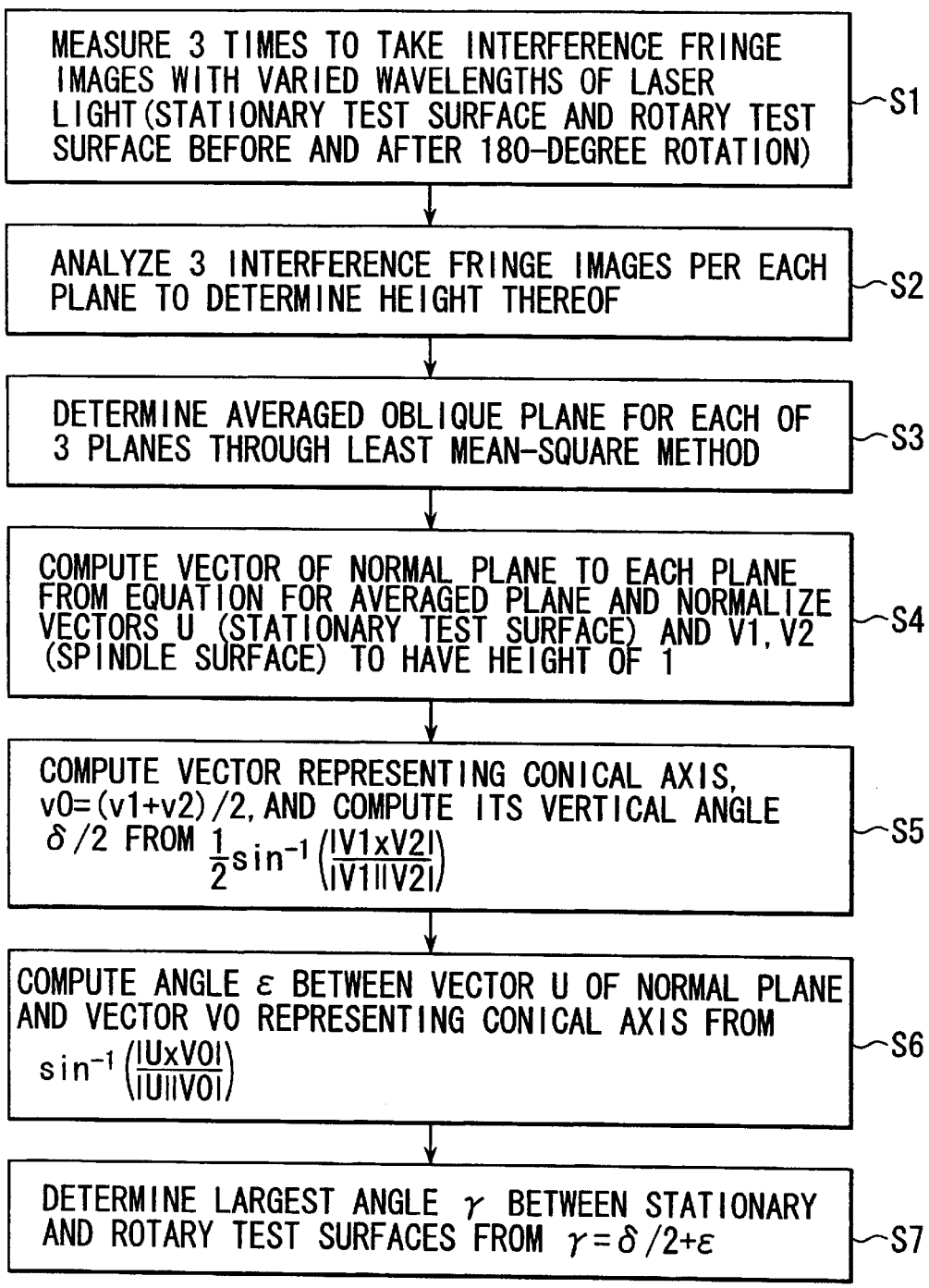
FIG. 11 is a flowchart showing process steps for measurement in the same measuring apparatus.

If both normal vectors of the stationary test surface 1 and to the stationary test surface 2 are not coincident with each other, this V2h is employed for V2 in the step S4 of FIG. 11.

(4) Construction of a Geometric Model for Testing the Parallelism of Stationary and Rotary test Surfaces As described above, the normal vector U of the stationary test surface M1 and the normal vectors V1, V2 of the rotary test surface M2 at two 180-degree different locations are 180-degree different vectors about the rotation axis of the conical circle. The parallelism of the stationary test surface M1 and the rotary test surface M2 is represented by an angle θ between the normal vector U of the stationary test surface M1 and the normal vector of the rotary test surface M2, for example, V1:

$$\theta = \sin^{-1}\left(\frac{|V1 \times U|}{|V1||U|}\right) \quad (18)$$

It can be found that the smaller the angle θ, the better the parallelism.

If the rotary test surface M2 is not perpendicular to the rotation axis, the above angle θ differs in accordance with the location of the normal vector. Therefore, it is required to obtain the largest angle between the normal vector U of the stationary test surface and the normal vector of the spindle surface to define the parallelism with it. Namely, it is required to obtain an angle θ defined by the following relation.

$$\theta = \max_{v}\left(\frac{|V \times U|}{|V||U|}\right) \quad (19)$$

where v denotes the normal vector of the rotary test surface M2.

Figure 16:
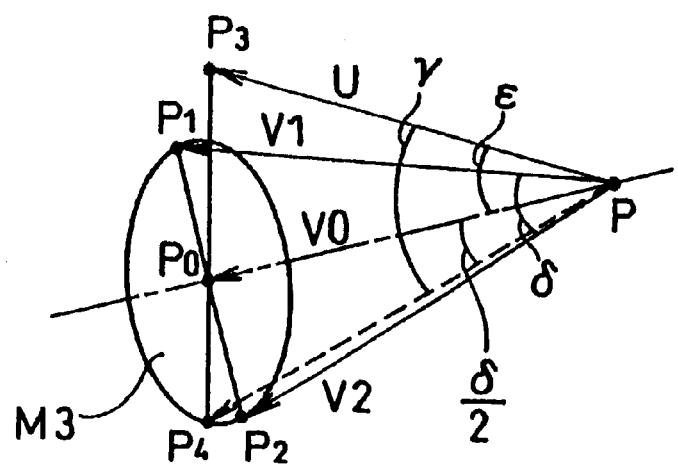

(5) Algorithm for Determining the Parallelism of Stationary and Rotary test Surfaces An algorithm for determining the parallelism according to the present invention will be described based on FIG. 16.

The normal vectors V1, V2 of the rotary test surface M2 are defined as V1=P→P$_1$, V2=P→P$_2$. In addition, the normal vector U of the stationary test surface M1 is defined as U=P→P$_3$, where U has the opposite direction to that in FIG. 12. It is assumed that the three measured vectors U, V1, V2 are normalized to have a length of 1 as described in (3).

First, points P$_1$, P$_2$ are the most distal points with respect to the conical cross-section, and its vertical angle or an angle of V1 to V2, ∠P$_1$PP$_2$, is obtained by:

$$\delta = \sin^{-1}\left(\frac{|V1 \times V2|}{|V1||V2|}\right) \quad (20)$$

The midpoint P$_0$ between P$_1$ and P$_2$ is present on the axis of the cone because V1 and V2 have a relation of just 180 degrees between them. Accordingly, V0=P→P$_0$ can be obtained by:

$$V0 = \frac{(V1 + V2)}{2} \quad (21)$$

Therefore, a relation of ∠P$_1$PP$_0$=δ/2 is satisfied (S5). Next, from U and V0, a vertical angle ε between them is similarly obtained by:

$$\varepsilon = \sin^{-1}\left(\frac{|U \times V0|}{|U||V0|}\right) \quad (22)$$

As point P$_0$ is the midpoint of points P$_1$, P$_2$, then point P$_1$, P$_2$, P$_0$ are present on the same straight line. When P$_4$ is used to denote a point that passes from P$_3$ to P$_0$ and crosses the conical surface, points P$_3$, P$_4$, P$_0$ are also present on the same straight line. Accordingly, points P$_1$, P$_2$, P$_0$, P$_3$, P$_4$ are commonly present on a plane defined by a straight line formed from points P$_1$, P$_0$, P$_2$ and a straight line formed from points P$_3$, P$_0$, P$_4$. A cross-section where this plane crosses the cone is shown with M3 in FIG. 16. This cross-section M3 is not always perpendicular to the axis of the cone and becomes an oval. Any vector V on the cone, which extends from point P to any point on the oval or a contour of the cross-section M3, and a vector V0 present on the axis of the cone, however, always make an angle of δ/2 between them. Therefore, the vector V on the conical surface, which has the largest angle to the normal vector U of the stationary test surface, is a vector that extends to point P$_4$, which locates on the conical surface at the opposite side of P$_3$ relative to point P$_0$. In this case, the largest angle is represented by γ=(δ/2)+ε. The largest deviated angle γ between the stationary M1 and rotary M2 test surfaces is thus determined, and differences in the parallelism can be evaluated from this angular value (S7). The smallest angle is also determined by γ=−(δ/2)+ε as well, Although the above description is made for the case where one of two test surfaces is stationary and the other rotary, the present invention is also applicable to the case where both are rotary. When both test surfaces are rotary, instead of the angle ε between the normal vector U of the stationary surface and the spindle axis, an angle δ' is employed to obtain δ'/2 and determine α=(δ/2)+(δ'/2). The angle δ' is made between a second spindle axis at locations of 0-degree and 180-degree for rotating the stationary test surface and the normal vector of the test surface M1. In addition, the central vector V0' along the conical axis of the rotary test surface M1 is obtained in (5) as well as the central vector V0 along the conical axis of the rotary test surface M2. An angle between vectors V0 and V0' is represented by:

$$\varepsilon' = \sin^{-1}\left(\frac{|V0 \times V0'|}{|V0||V0'|}\right) \quad (23)$$

Thus, the largest deviated angle between both test surfaces M1 and M2 is finally represented by γ=α+ε'. In addition, the smallest deviated angle between both test surfaces is represented by γ=−α+ε'.

The present invention is not limited in the embodiments described above. Rather, in the step of obtaining a plurality of interference fringe images with different phases, optical phase shift methods disclosed in Japanese Patent Application Nos. 10-164291 and 11-136831 filed by the Applicant can be employed. These methods allow the plurality of interference fringe images with different phases to be taken simultaneously to improve the speed and reliability of measurement. Besides, well-known technologies for displacing the reference surfaces of the interferometer may also be employed. In addition, in the step of obtaining an obliquity of a typical plane, the typical plane may be an averaged plane that is obtained by averaging two heights of circumscribed and inscribed planes.

As obvious from the above, in the method and apparatus of the present invention, an obliquity of a rotary test surface is measured at a first position and at a second position rotated from the first position by a predetermined angle. Then, a cone described by a normal vector of the rotary test surface is assumed from the obliquity of the rotary test surface at each position. Thus, the largest and smallest angles can be obtained from the angle between the normal vector of the other test surface and the vertical angle of that assumed cone, improving the accuracy of measurement and evaluation.

Having described the embodiments consistent with the present invention, other embodiments and variations consistent with the invention will be apparent to those skilled in the art. Therefore, the invention should not be viewed as limited to the disclosed embodiments but rather should be viewed as limited only by the spirit and scope of the appended claims.

What is claimed is:

1. An apparatus for measuring the parallelism of two opposite surfaces, comprising:

an interference optical system for leading parallel beam to a pair of opposed test surfaces and then leading, from said test surfaces via different optical paths, interference fringe images formed by radiation of said parallel beam to said test surfaces, respectively; and means for imaging said interference fringe images led via said different optical paths, respectively;

said interference optical system includes:

a measurement head being interposed between said test surfaces and having a pair of opposite reference surfaces formed thereon so as to oppose to said test surfaces, said reference surfaces being defined with a highly accuracy parallelism and distance;

a lens system for collimating a light emitted from a light source into said parallel beam; and a splitting optical system for splitting said parallel beam from said lens system into two optical paths, leading said two split parallel beam to said test surfaces via said reference surfaces and then leading said interference fringe images to said means for imaging, each of said interference fringe images being created through interference between a light reflected at each of said test surfaces and a light reflected at the corresponding reference surface opposing thereto.

2. The apparatus according to claim 1, wherein said measurement head is provided at the outside of at least one of said reference surfaces with a movable pressure plate for applying an appropriate measuring force onto said test surfaces.

3. The apparatus according to claim 1, further comprising an arithmetic unit for computing the flatness and parallelism of said test surfaces from said interference fringe images taken by said means for imaging.

4. The apparatus according to claim 3, wherein said arithmetic unit computes the flatness and parallelism of said test surfaces using at least three optical phase-shifted interference fringe images obtained from two sets of said means for imaging while altering a wavelength of said light from said light source in several stages.

5. The apparatus according to claim 1, wherein at least one of said test surfaces is rotary relative to the other about a rotational axis substantially along the opposing direction, said apparatus further comprising an arithmetic unit for computing the parallelism of said test surfaces from said interference fringe images taken by said means for imaging, said arithmetic unit executing:

measuring obliquities of said rotary test surface of said pair of test surfaces at a first position and at a second position rotated from said first position about said rotational axis by a predetermined angle;

assuming a cone or cones described by normal vectors of said rotary test surface based on said obliquities of said rotary test surfaces measured at said first and second positions; and computing at least one of the largest and smallest angle between said pair of test surfaces from axes and vertical angles of said one or more assumed cones.

6. A method of measuring the parallelism of two opposite surfaces, comprising:

radiating parallel beam via reference surfaces to a pair of test surfaces, said test surfaces being opposed to each other, at least one of said test surfaces being rotary relative to the other about a rotational axis substantially along the opposing direction; and observing individually interference fringe images each obtained from interference between a light reflected at each of said test surfaces and a light reflected at the corresponding one of said reference surfaces to measure the parallelism of said pair of test surfaces, said method further comprising the steps of:

measuring obliquities of said rotary test surface of said pair of test surfaces at a first position and at a second position rotated from said first position about said rotational axis by a predetermined angle;

assuming a cone or cones described by normal vectors of said rotary test surface based on said obliquities of said rotary test surface measured at said first and second positions; and computing at least one of the largest and smallest angles between said pair of test surfaces from axes and vertical angles of said one or more assumed cones.

7. The method according to claim 6, wherein said step of measuring obliquities of a rotary test surface includes the steps of:

obtaining a plurality of said interference fringe images with different phases through a plurality of measurements per one position and test surface;

analyzing said plurality of interference fringe images to compute a height of each test surface acquired from the preceding step; and computing an obliquity of a typical plane of said each test surface from said height of each test surface obtained from the preceding step.

8. The method according to claim 7, wherein said step of computing an obliquity of a typical plane comprises computing said obliquity of said typical plane of each test surface through the least mean-square method.

9. The method according to claim 7, wherein said step of computing an obliquity of a typical plane comprises computing said obliquity of said typical plane of each test surface from an oblique plane circumscribed or inscribed.

10. The method according to claim 6, wherein one of said pair of test surfaces is rotary and the other stationary, said method comprising the steps of:

measuring an obliquity of said other test surface and computing a normal vector of said other test surface from said obliquity measured; and computing at least one of the largest and smallest angles between said pair of test surfaces based on an angle between an axis of a cone described by a normal vector of said one test surface and a normal vector of said other test surface and a vertical angle of said cone.

11. The method according to claim 6, wherein said pair of test surfaces are both rotary, said method comprising the step of:

computing at least one of the largest and smallest angles between said pair of test surfaces from angles between axes of cones described by respective normal vectors of said test surfaces and vertical angles of said respective cones.

12. The method according to claim 6, wherein said step of measuring an obliquity of a rotary test surface comprises the steps of:

obtaining a group of interference fringe images S1 of one of said pair of test surfaces at a first position and a group of interference fringe images R1 of the other at said first position;

obtaining a group of interference fringe images S1' of one of said pair of test surfaces at said first position and a group of interference fringe images R2 of the other at said second position;

computing an amount of compensation required for matching a typical plane M1' obtained from said group of interference fringe images S1' with a typical plane M1 obtained from said group of interference fringe images S1; and compensating a typical plane obtained from said group of interference fringe images R2 with said amount of compensation.

13. The method according to claim 12, wherein said amount of compensation includes a rotational axial position and rotational angle for matching said normal vector of said optical plane M1' with said normal vector of said typical plane M1.

14. An apparatus for measuring the parallelism of two opposite surfaces, comprising:

an interference optical system for leading parallel beam to a pair of opposed test surfaces and then leading, from said test surfaces via different optical paths, interference fringe images formed by radiation of said parallel beam to said test surfaces respectively; and means for imaging said interference fringe images led via said different optical paths, respectively, wherein at least one of said test surfaces is rotary relative to the other about a rotational axis substantially along the opposing direction, said apparatus further comprising an arithmetic unit for computing the parallelism of said test surfaces from said interference fringe images taken by said means for imaging, said arithmetic unit executing:

measuring obliquities of said rotary test surface of said pair of test surfaces at a first position and at a second position rotated from said first position about said rotational axis by a predetermined angle;

assuming a cone or cones described by normal vectors of said rotary test surface based on said obliquities of said rotary test surface measured at said first and second positions; and computing at least one of the largest and smallest angles between said pair of test surfaces from axis and vertical angles of said one or more assumed cones.

15. The apparatus according to claim 14, wherein said interference optical system includes:

a measurement head being interposed between said test surfaces and having a pair of opposite reference surfaces formed thereon so as to oppose to said test surfaces, said reference surfaces being defined with a highly accuracy parallelism and distance;

a lens system for collimating a light emitted from a light source into said parallel beam; and a splitting optical system for splitting said parallel beam from said lens system into two optical paths, leading said two split parallel beam to said test surfaces via said reference surfaces and then leading said interference fringe images to said means for imaging, each of said interference fringe images being created through interference between a light reflected at each of said test surfaces and a light reflected at the corresponding reference surface opposing thereto.

\* \* \* \* \*

UNITED STATES PATENT AND TRADEMARK OFFICE
CERTIFICATE OF CORRECTION

PATENT NO. : 6,633,387 B1  Page 1 of 1
DATED : October 14, 2003
INVENTOR(S) : Kiyokazu Okamoto et al.

It is certified that error appears in the above-identified patent and that said Letters Patent is hereby corrected as shown below:

<u>Colunm 12,</u>
Line 44, change "by ez and ey is" to -- by ex and ey is --.

Signed and Sealed this

Twenty-seventh Day of January, 2004

JON W. DUDAS
*Acting Director of the United States Patent and Trademark Office*